Figure 5:
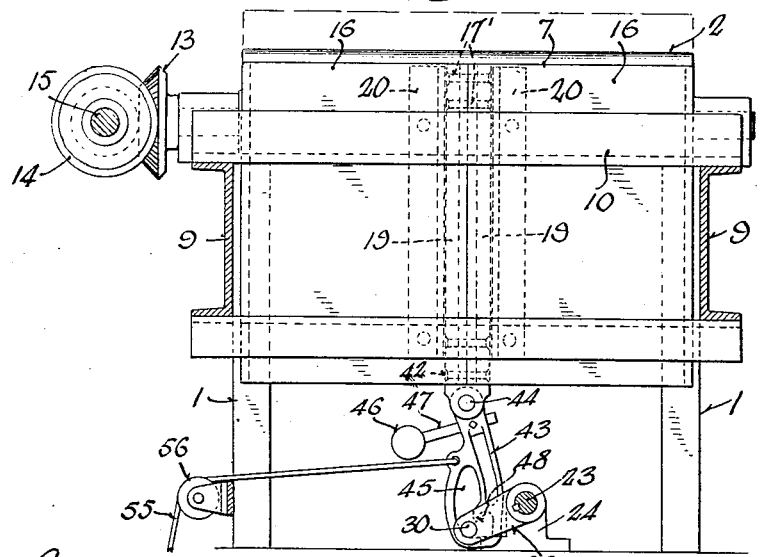

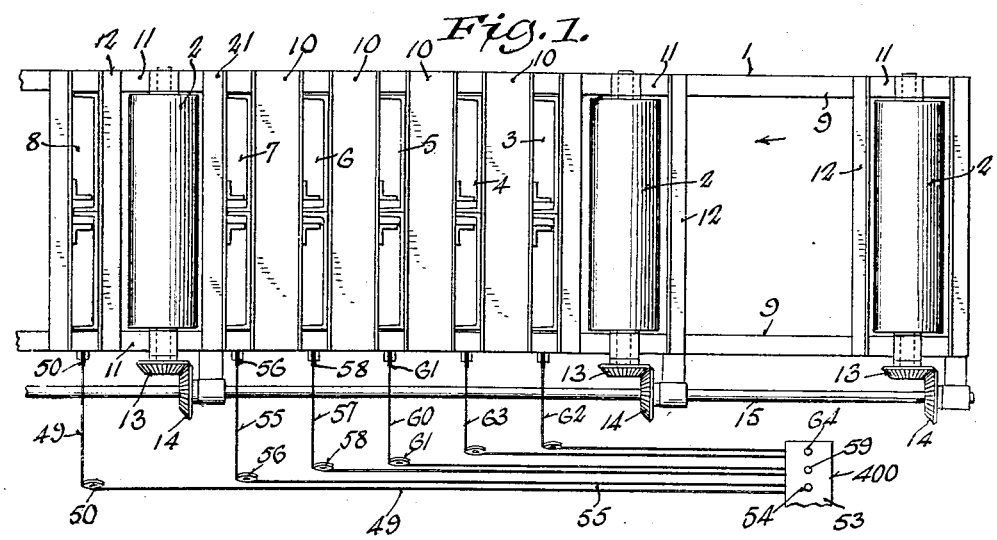

Dec. 24, 1929.  G. M. PELTON  1,740,998
LUMBER SAWING MACHINE
Filed Jan. 2, 1925  2 Sheets-Sheet 2

INVENTOR.
GEORGE M. PELTON
BY
Bottum, Hudnall, Lecher & McNamara
ATTORNEYS.

Patented Dec. 24, 1929

1,740,998

UNITED STATES PATENT OFFICE

GEORGE M. PELTON, OF MILWAUKEE, WISCONSIN, ASSIGNOR TO THE FILER & STOWELL CO., OF MILWAUKEE, WISCONSIN, A CORPORATION OF WISCONSIN

LUMBER-SAWING MACHINE

Application filed January 2, 1925. Serial No. 55.

This invention relates to improvements in lumber sawing machines, and more particularly to means for actuating bumpers or stops for controlling the lengths to which the lumber is cut.

An object of the invention is to provide a lumber cut-off machine having stops with improved means for selectively actuating the same.

Another object is to provide a lumber cut-off machine with stops or bumpers arranged to control the length to which the lumber is cut with actuating means common to the stops and means for selectively connecting the stops with the actuating means for movement thereby.

Other objects and advantages will hereinafter appear.

For the purpose of illustrating the invention, an embodiment thereof is shown in the drawings, in which—

Figure 6:
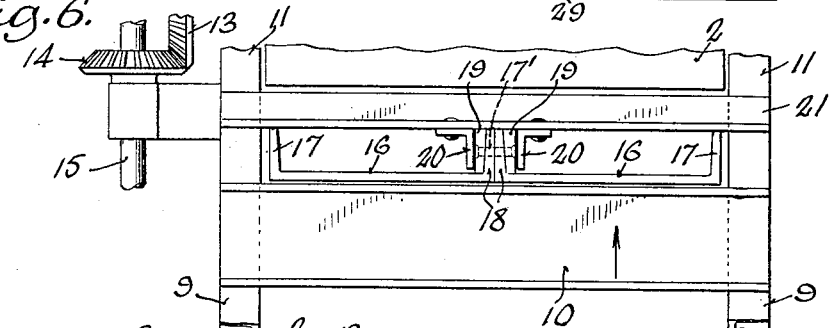
Figure 7:
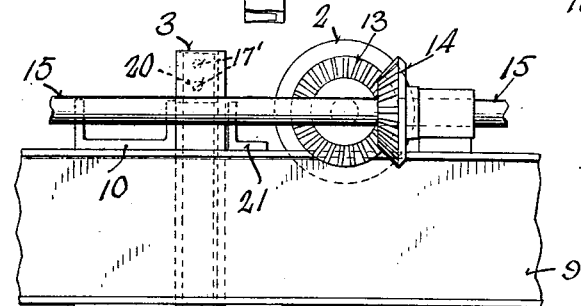

Figure 1 is a plan view;
Fig. 2 is a side elevation;
Fig. 3 is a section on line 3—3 of Fig. 2;
Fig. 4 is a detail end elevation looking toward the left in Fig. 2;
Fig. 5 is a section on line 5—5 of Fig. 2;
Fig. 6 is a plan view of Fig. 5; and
Fig. 7 is an enlarged side elevation.

The embodiment of the invention shown comprises a frame 1, rollers 2 arranged transversely thereto, bumpers 3, 4, 5, 6, 7 and 8 arranged for movement in the frame and means 400 for selectively actuating the stops or bumpers. The frame 1 may comprise channel members 9 and other channel members 10 secured and arranged transversely thereto. The rollers 2 may be journaled in the end members 11 of rectangular frames 12 cast in one piece, the frames being arranged transversely to channel members 9 and secured thereto as shown in Fig. 1.

The axles of rollers 2 may be provided with bevel gears 13 which mesh with and are driven by bevel gears 14 fixed to a drive shaft 15. Each stop or bumper may be made up of a pair of channel members 16 arranged as shown in Fig. 6 and secured together by any suitable means such as rivets 17' passing through adjacent flanges 18 of the members.

Blocks or fillers 19 may be placed against the inner face of each flange 18, as shown in Fig. 6, and secured thereto by the rivets 17' to provide an even surface for sliding movement against angle members or guides 20 riveted to an angle member 21 placed across channel members 9 and secured thereto. The edges of flanges 17 and 18 of channel members 16 are in the same vertical plane and engage angle member 21 for the purpose hereinafter explained.

The mechanism or means 400 for selectively actuating stops or bumpers will now be described. A shaft 23 journaled in suitable bearings 24 is provided with spaced arms 25 connected to the piston rod 26 of a fluid pressure cylinder 27 by means of a rod 28, the upper end of the rod being connected to the bifurcated end of arm 25 by any suitable means such as a pin, as shown in Fig. 7. Spaced arms 29 having a pin 30 connecting the free ends thereof are fixed to shaft 23 below each of the stops or bumpers, for the purpose hereinafter explained. A suitable valve having a stem 31 is slidably fitted in valve casing 32 and adapted to admit fluid under pressure to the under side of the piston of cylinder 27, or to connect the lower end of the cylinder with the atmosphere. The valve stem 31 passes loosely through a guide or collar 33 which may be cast integral with the valve casing, and is provided at the end thereof with a stop 34. A spring 35 is arranged between collar 33 and stop 34 to urge the valve to its uppermost position, in which position the valve connects the lower end of cylinder 27 with the atmosphere, so that the piston and rod 28 connected thereto move to their lowermost positions. Arms 25 and 29 will then be in the position shown in Figs. 3 and 5. A lever 36 is pivotally connected to the valve casing at 37 and to valve stem 31 and 38. A rope or cable 39 is connected to the outer end of lever 36 and passed over suitable pulleys 40 to the lower end of a plunger or pedal 41 which may be mounted in the floor of the mill. By placing his foot upon pedal 41, the operator effects downward movement of valve stem 31 and the valve connected thereto, against the action of spring 35. Fluid under pressure is then admitted to the underside of the piston in cylinder 27 and the rod 28 moved upwardly to rotate shaft 23 and arms 25 and 29 in a clockwise direction, as viewed in Fig. 3, for the purpose hereinafter explained.

Each stop or bumper is provided at the lower edge thereof with suitable lugs 42 to which a clutch or member 43 is pivotally connected by any suitable means such as a pin 44. The lower portion of member 43 is provided with an opening 45 through which pin 30 moves when the member is in inoperative position, as hereinafter explained. A weight 46 may be secured to each member 43 by means of an arm 47, as shown in Fig. 5, to hold the member in inoperative position. The lower end of member 43 is shaped as shown in Fig. 5 to provide a hook 48 arranged to be engaged by pin 30 when the member is swung a given amount about the pin or pivot 44, against the action of weight 46, and shaft 23 rotated. The pin 30 will then raise the stop or bumper through its connection therewith by means of member 43. The means for moving the member 43 of any stop so that pin 30 engages hook 48 and lifts the stop, whereby selective actuation of the stops may be effected, will now be explained.

Referring to bumper 8, as an example, a rope or cable 49 is secured to its member 43 and passed over suitable pulleys 50 to one end of a lever 51 pivotally connected at 52 in any suitable way to a plate 53 and provided with an actuating lever 54. A similar cable or rope 55 is connected to member 43 of stop 7 and passed over pulleys 56 to the other end of lever 51, as shown in Figs. 1 and 2. By moving lever 54 backwardly, cable 49 will be tightened and member 43 of stop 8 swung outwardly against the action of weight 46 to bring hook 48 into the path of movement of pin 30. Actuation of pedal 41 will then effect rotation of shaft 23 to move pin 30 upwardly. Bumper 8, through its connection with pin 30 by means of member 43 will then be raised to the position shown in dotted lines in Fig. 5. Each member 43 of the other stops or bumpers is held in inoperative position by means of weights 46, so that the respective pins 30 for these stops move through the openings 45 and cause no movement of the stops. Upon release of pedal 41, spring 35 will return the valve of cylinder 27 to exhaust position to permit shaft 23 and stop 8 to return to initial position. Forward movement of lever 54 will tighten cable 55 and move member 43 of stop 7 into operative position to connect the stop with shaft 23 for movement thereby in the same manner as explained above in connection with stop 8. Lever 54 thereby effects actuation of stop 8 by movement thereof in one direction and actuation of stop 7 by movement thereof in another direction.

The member 43 of bumper 6 is moved into operative position by means of a cable 57 connected thereto and passed over pulleys 58 to one end of a lever similar to 51 provided with an actuating lever 59. Member 43 of bumper 5 is moved into operative position by means of a cable 60 passed over pulleys 61 and connected to the other end of the lever actuated by lever 59. The arrangement is similar to that explained above in connection with lever 54, whereby forward movement of lever 59 effects actuation of stop 6 while backward movement thereof effects actuation of stop 5. The members 43 of stops 3 and 4 are connected in the same manner by cables 62 and 63, respectively, for actuation by means of a lever 64. Forward movement of lever 64 effects actuation of stop 4 while backward movement thereof effects actuation of stop 3 in the same manner as explained above in connection with levers 54 and 59. Three actuating levers and six stops or bumpers controlled thereby have been shown in the drawings, but of course any number of stops and levers may be used. The plate 53 may be secured in any suitable manner to frame 1 so that the actuating levers 54, 59 and 64 for the stops are accessible to the operator.

The lumber is placed upon live rolls 2 and carried forward thereby in the direction of the arrows in Figs. 1, 2 and 6, until the forward end of the lumber strikes the stop or bumper which has previously been raised above the top of the rollers to the dotted line position shown in Fig. 5. The saw is then operated in the usual manner to cut the lumber to the required length. The lengths to which the lumber is cut will depend of course upon which particular stop is raised.

Referring to Figs. 2 and 6, angle member 21 takes the strain caused by the impact of the lumber against stop 7, the edges of flanges 17 and 18 engaging member 21 for this purpose, as explained above. The forward flanges of channel members 10 engage bumpers 3, 4, 5 and 6 for the same purpose, as shown in Fig. 7.

The fluid pressure cylinder 27 for actuating shaft 23 may be of any suitable construction well known to those skilled in the art and has only been shown and described with sufficient clearness to show the manner in which it may be used in the present embodiment of the invention. Any other suitable means, of course, may be used to actuate shaft 23 and no claim to the specific means therefor is made.

The invention has been shown and described as embodied in a machine for cutting lumber to different lengths, but of course it may well be employed in machines for many other purposes such as the punching or cutting of sheet metal and the performing of different operations on like material, where it is necessary to work on one portion of the material at one time, and another portion thereof at a different time, the stops holding the required portions of the material in the proper positions with respect to the tool.

Various changes in the structure and arrangement of the parts may be adopted without departing from the spirit of the invention or the scope of the claims.

The invention claimed is:

1. In a machine of the character described, the combination with the stops thereof, of an operating member common to said stops, elements supported intermediate said member and said stops for shifting movement with respect to said member and said stops and arranged upon shifting movement to operative position to provide an operating connection between any one of said stops and said member, a controlling member supported for movement in a plurality of directions and connected to said elements for causing movement of one to its respective operative position upon movement in one of said directions and for causing movement of another of said elements to its respective operative position upon movement in another of said directions.

2. In a machine of the character described, the combination with the stops thereof, of an operating member common to said stops, elements supported intermediate said member and said stops for shifting movement with respect to said member and said stops and arranged upon shifting movement to operative position to provide an operating connection between any one of said stops and said member, a controlling lever supported for pivotal movement and connected to said elements for causing movement of one to its respective operative position upon movement in one direction and for causing movement of another of said elements to its respective operative position upon a reverse movement.

3. In a machine of the character described, a plurality of stops, a shaft, means to effect rotation of said shaft, and a member pivotally connected to each of said stops and adapted to be shifted to cooperate with said shaft whereby said stop is actuated upon rotation of the latter and also adapted to be shifted to inoperative position wherein it is not actuated upon rotation of the shaft, and means for selectively placing said members in operative or inoperative positions.

4. In a machine of the character described, a plurality of stops, a shaft, pins fixed to said shaft for rotation therewith, a member pivotally connected to each of said stops and shiftable to a position wherein it cooperates with one of said pins to connect said stop with said shaft for movement thereby, and means for selectively placing said members in operative or inoperative positions.

5. In a machine of the character described, a plurality of stops, a shaft, pins fixed to said shaft for rotation therewith, a member pivotally connected to each of said stops and shiftable to a position wherein it cooperates with one of said pins to connect said stop with said shaft for movement thereby, and levers connected to said members for placing the same in operative or inoperative positions.

6. In a machine of the character described, a plurality of stops, a shaft, pins fixed to said shaft for rotation therewith, a member pivotally connected to each of said stops and shiftable to a position wherein it cooperates with one of said pins to connect said stop with said shaft for movement thereby, and a lever connected to said members for selectively actuating the same, one of said members being actuated by a given movement of said lever and another of said members being actuated by an opposite movement of said lever.

7. In a machine of the character described, a plurality of stops, a shaft, pins fixed to said shaft for rotation therewith, a member pivotally connected to each of said stops and shiftable to a position wherein it cooperates with one of said pins to connect said stop with said shaft for actuation thereby, said members being normally in inoperative position, an actuating lever common to said members, one of said members being moved to operative position by a given movement of said lever and another of said members being moved to operative position by another movement of said lever.

8. In a machine of the character described, the combination with a plurality of stops, and means for causing movement thereof and being normally disconnected therefrom, of a member connected to each of said stops for movement with respect thereto and arranged upon such movement to cooperate with said means upon operation of the latter to effect movement of the stop, operating means for said means, and means for selectively placing said members in operative relation with respect to said first-named means.

9. In a machine of the character described, the combination with a plurality of stops, and means for effecting movement thereof, of a member connected to each of said stops for movement with respect thereto, said member being adapted upon a given movement thereof to provide a driving connection between said means and said stop and upon a further movement thereof to prevent movement of said stop by said means.

10. In a machine of the character described, the combination with a plurality of stops, and means for effecting movement thereof, of a member pivotally connected to each of said stops, said member being arranged and adapted upon movement thereof in a given direction to connect the stop to said means for movement thereby and upon a reverse movement thereof to disconnect the stop from said means to prevent movement thereby.

11. In a machine of the class described, the combination with the stops thereof, of an operating member common to said stops, means supported intermediate said member and said stops for selective shifting movement with respect to said member and said stops whereby to provide an operating connection between any one of said stops and said member upon proper selective shifting of said means, and means for selectively shifting said means for effecting selective actuation of said stops by said member.

12. In a machine of the character described, the combination with the stops thereof, of a shaft mounted for oscillation but held against longitudinal movement, a plurality of crank arms fixed to the shaft and having pins, a shiftable connecting member pivotally secured to each stop, the connecting members having openings receiving the pins of the crank arms, each connecting member having a hook projecting into its opening and designed to be engaged with and also disengaged from its pin, means for biasing the connecting members to a position wherein their hooks are disengaged from the pins, and means for selectively shifting the connecting members to cause the hook of any connecting member to engage its pin whereby, upon proper movement of the shaft, the selected stop will be operatively positioned.

13. In a machine of the character described, the combination with the stops thereof, of a rotatable shaft common to said stops, a connecting member shiftably mounted on each stop and having a hook, crank arms fixed to the shaft and having pins with which the hooks of the connecting members may be selectively engaged, and means for selectively shifting the connecting members.

14. In a machine of the character described, the combination with the stops thereof, of a rotatable shaft common to said stops, a connecting member shiftably mounted on each stop and having a hook, crank arms fixed to the shaft and having pins with which the hooks of the connecting members may be selectively engaged, means for selectively shifting the connecting members and including a plurality of levers, there being one lever for every two connecting members, each lever having two arms, and a cable connecting each arm of each lever to the connecting member which it controls.

15. In a machine of the character described the combination with a plurality of stops, of a shaft mounted for oscillation but held against longitudinal movement, a plurality of independently shiftable connecting members between said shaft and said stops, each connecting member affording in one of its positions an operating connection between the shaft and its stop and in its other position disconnecting its stop from the shaft, controllable means for oscillating the shaft and means independent of the shaft and of its controlling means for selectively and independently shifting the connecting members whereby any stop may be connected with and actuated from the shaft or disconnected therefrom.

16. In a machine of the character described the combination with a plurality of stops, of an operating member common to said stops, a plurality of independently shiftable connecting members between said operating member and said stops, each connecting member affording in one of its positions an operating connection between the operating member and its stop and in its other position disconnecting its stop from the operating member, and means independent of the operating member for selectively shifting said stops.

In witness whereof I hereto affix my signature.

GEORGE M. PELTON.